United States Patent [19]

Howell

[11] Patent Number: 5,511,865
[45] Date of Patent: Apr. 30, 1996

[54] APPARATUS FOR RESONANCE CONTROL IN A BRAKE INTERVENTION TRACTION CONTROL SYSTEM

[75] Inventor: Mark L. Howell, Leamington Spa, England

[73] Assignee: Lucas Industries public limited company, Solihull, England

[21] Appl. No.: 301,581

[22] Filed: Sep. 7, 1994

[30] Foreign Application Priority Data

Sep. 7, 1993 [GB] United Kingdom ............... 9318502

[51] Int. Cl.$^6$ .................................................. B60T 8/24
[52] U.S. Cl. ........................ 303/139; 303/177; 303/191; 180/197
[58] Field of Search ............................ 303/113.1, 113.2, 303/100, 113.1, 93, 103, 106, 105, 112, 108, 109, 110, 111, 102, 139–145, 177, 168, 158, 156, 157, 194–196, 199, 191; 180/197; 364/426.03, 426.02; 188/181 A, 181 T

[56] References Cited

U.S. PATENT DOCUMENTS

| | | | |
|---|---|---|---|
| 4,681,373 | 7/1987 | Nomura et al. | 303/106 |
| 4,962,824 | 10/1990 | Hagiya et al. | 180/197 |
| 5,003,481 | 3/1991 | Matsuda | 364/426.02 |
| 5,117,934 | 6/1992 | Tsuyama et al. | 364/426.03 |
| 5,169,213 | 12/1992 | Matsuda et al. | 303/113.2 |

Primary Examiner—Douglas C. Butler
Attorney, Agent, or Firm—Oblon, Spivak, McClelland, Maier, & Neustadt

[57] ABSTRACT

An apparatus for attenuating wheel speed variation during periods of brake intervention traction control is provided. The speed of the or each driven wheel is monitored and the braking force applied to the or each driven wheel is controlled in accordance with the wheel speed and wheel acceleration. Braking force may be increased when a rate of change of wheel acceleration is increasing and the wheel is accelerating (i.e. between periods B and C of FIG. 5c); whereas braking force may be decreased when the rate of change of wheel acceleration is decreasing and the wheel is decelerating (i.e. between periods D and E of FIG. 5c).

8 Claims, 6 Drawing Sheets

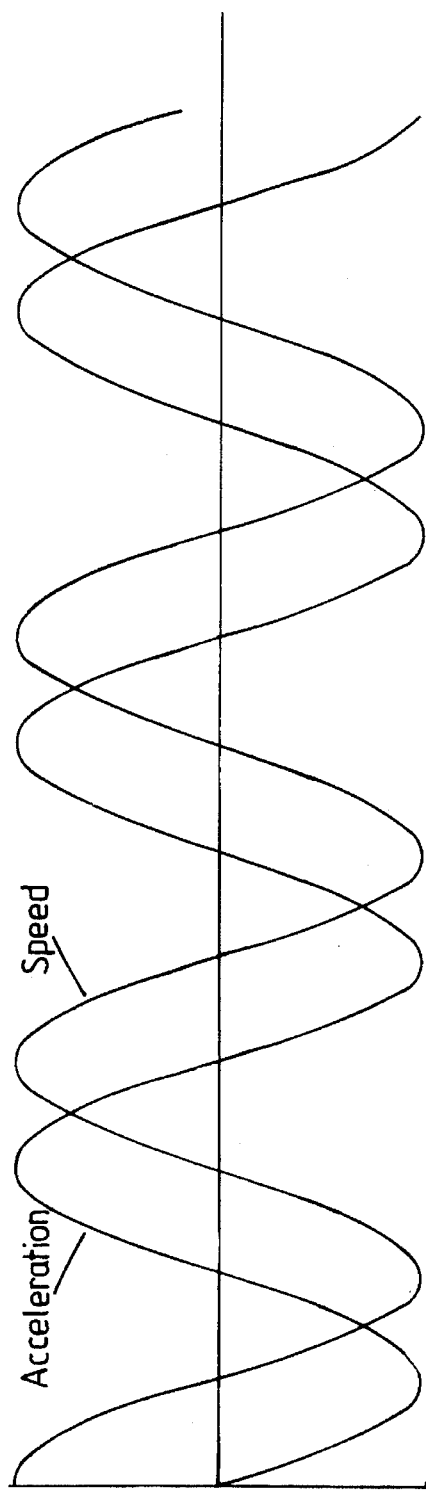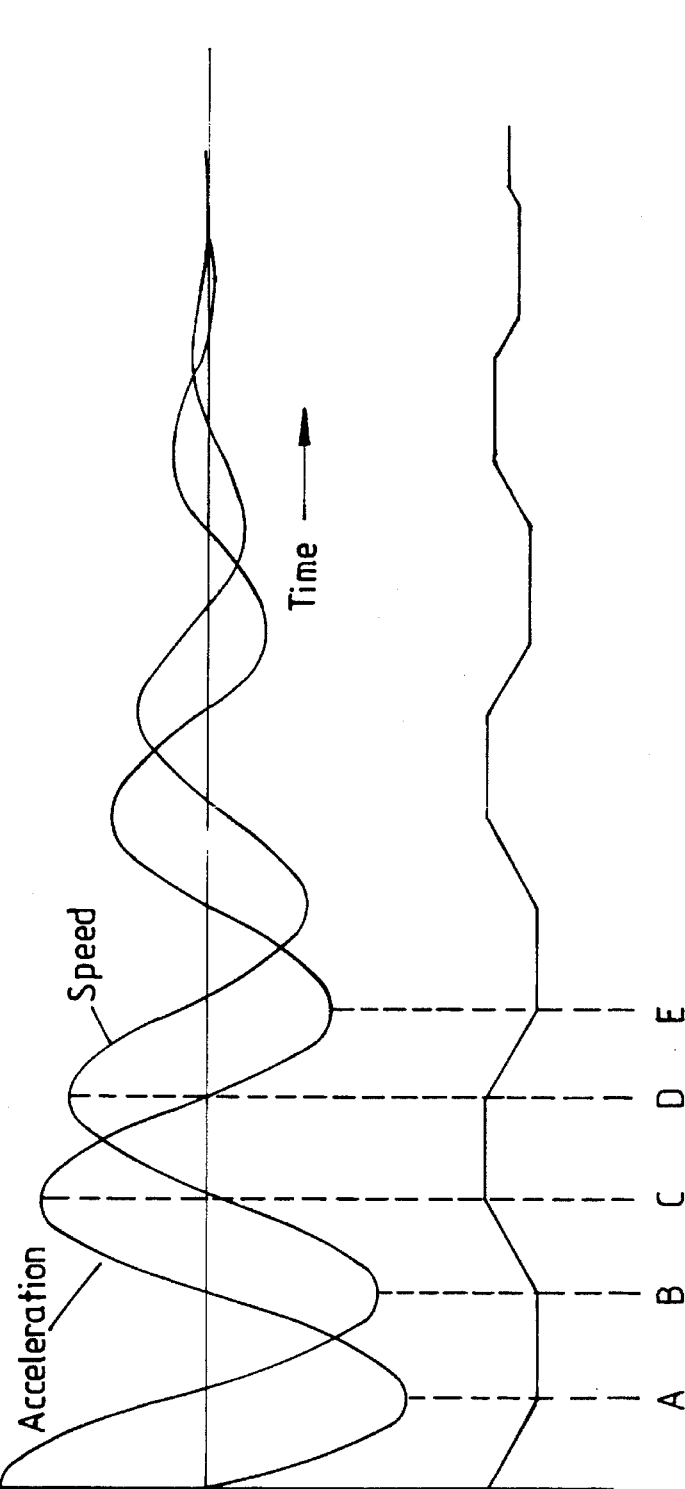

APPARATUS FOR RESONANCE CONTROL IN A BRAKE INTERVENTION TRACTION CONTROL SYSTEM

BACKGROUND OF THE INVENTION

1. Field of the Invention

The present invention relates to an apparatus for control of resonance in a brake intervention traction control system.

2. Discussion of the Background

Brake intervention traction control is concerned primarily with providing a transfer of torque between driven wheels through a differential by braking the slipping wheel. Such a traction control (TC) system may be implemented in association with an anti-lock brake system (ABS). A schematic representation of the brake arrangement of a combined brake intervention traction control and anti-lock brake system is shown in FIG. 1 of the accompanying drawings, the system is only illustrated with respect to one wheel for clarity. The system comprises a master cylinder 2 arranged to supply fluid, in response to depression of a driver operated brake pedal 3, to a brake 4 of a wheel 5 via a flow control valve 6 and a first electrically operable solenoid valve 8. A series combination of a second electrically operable solenoid valve 10 and a pump 12 are connected in parallel with the flow control valve 6. The pump 12 is arranged to pump fluid towards the junction of the flow control valve and the first solenoid valve 8. A fluid reservoir 14 is connected to an inlet of the pump 12 via a third electrically operable solenoid valve 16.

During ABS operation the first valve 8 is open and the third valve 16 is closed. Pressure from the master cylinder 2 is applied to the brake 4 via the flow control valve 6. When the wheel 5 starts to skid, the second solenoid valve 10 is operated to allow a decrease in brake fluid pressure at the brake 4, thereby reducing the braking force applied to the wheel 5 and halting the skid. The brake fluid is pumped back to the master cylinder 2 to maintain the fluid volume in the master cylinder (otherwise the brake pedal 3 would sink to the floor). When the wheel 5 has stopped skidding, the second solenoid valve 10 is closed to allow fluid pressure to be reapplied to the brake 4.

During traction control operation, when one or more wheels start to spin under acceleration, the first valve 8 is closed and the third valve 16 is opened. The pump 12 is run so as to apply brake pressure to the brake 4 so as to reduce the drive torque applied through the spinning wheel 5. The fluid pressure is modulated by pulsing the second solenoid valve 10 so as to control the braking force applied by the brake 4. The action of a differential gear (not shown) provided to supply drive to wheels on opposite sides of a vehicle but on a common axle, provides a transfer of torque from the braked drive wheel to the unbraked (non-spinning) drive wheel, thereby enhancing acceleration.

A vehicle can suffer wheel vibration under acceleration due to factors such as compliance of the vehicle's suspension. The vibration may be exacerbated by traction control systems which aim to control the speed of a spinning wheel to slightly above the vehicle speed. During such control, the wheel alternately grips and slips, which may make the vibration worse, especially if the frequency of gripping and slipping is substantially coincident with a resonant frequency of the vehicle suspension. The resonance may be felt by the vehicle occupants as a disturbing juddering. Furthermore, the resonance may cause accelerated wear of suspension and transmission components.

SUMMARY OF THE INVENTION

According to a first aspect of the present invention, there is provided an apparatus for resonance control for a brake intervention traction controller, comprising control means for modulating the braking of at least one wheel in response to speed variations of the at least one wheel during periods of traction control intervention so as to attenuate the speed variations.

Preferably the speed variations of the at least one wheel is detected by measuring the speed of a respective one of the at least one wheel. Thus vibration of a wheel and its associated suspension may be detected using components that are also required by an ABS.

Preferably the braking force acting on a respective wheel is increased during a first period in which the rate of change of acceleration of the respective driven wheel is increasing, ie $d^2V/dt^2$ is positive where V is the speed of the respective wheel, and the wheel is accelerating. Preferably the braking force applied to the respective wheel peaks at the moment of maximum acceleration of the wheel.

Preferably the braking force acting on a respective wheel is decreased during a second period in which the rate of change of acceleration of the wheel is decreasing, ie $d^2V/dt^2$ is negative, and the wheel is decelerating. Preferably the braking force applied to the respective wheel is a minimum at the moment of maximum deceleration of the wheel.

According to a second aspect of the present invention there is provided a traction controller including a resonance control apparatus according to the first aspect of the present invention.

According to a third aspect of the present invention, there is provided a method of resonance control for a brake intervention traction control, comprising modulating the braking of at least one driven wheel in response to speed variations of the at least one wheel during periods of traction control intervention so as to attenuate the speed variations.

It is thus possible to control the brake pressure in a brake intervention traction control system to perform traction control while actively attenuating vibration of the wheel and resonance of the suspension.

BRIEF DESCRIPTION OF THE DRAWINGS

The present invention will further be described, by way of example, with reference to the accompanying drawings, in which:

FIG. 5a is a graph illustrating wheel acceleration and speed for an uncontrolled wheel, and FIGS. 5b and 5c are graphs illustrating wheel acceleration and speed, and brake fluid pressure, respectively, for a wheel controlled by the second embodiment of the present invention;

DESCRIPTION OF THE PREFERRED EMBODIMENTS

Figure 1:
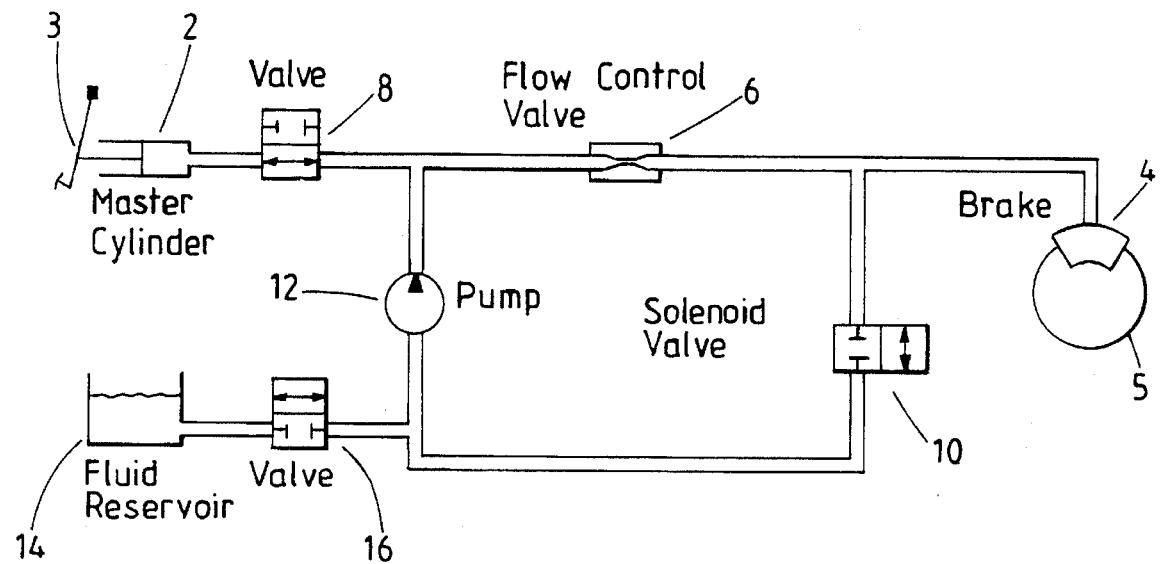
FIG. 1 is a schematic diagram of the hydraulic system of a combined brake intervention traction control and anti-lock brake system.
Figure 2:
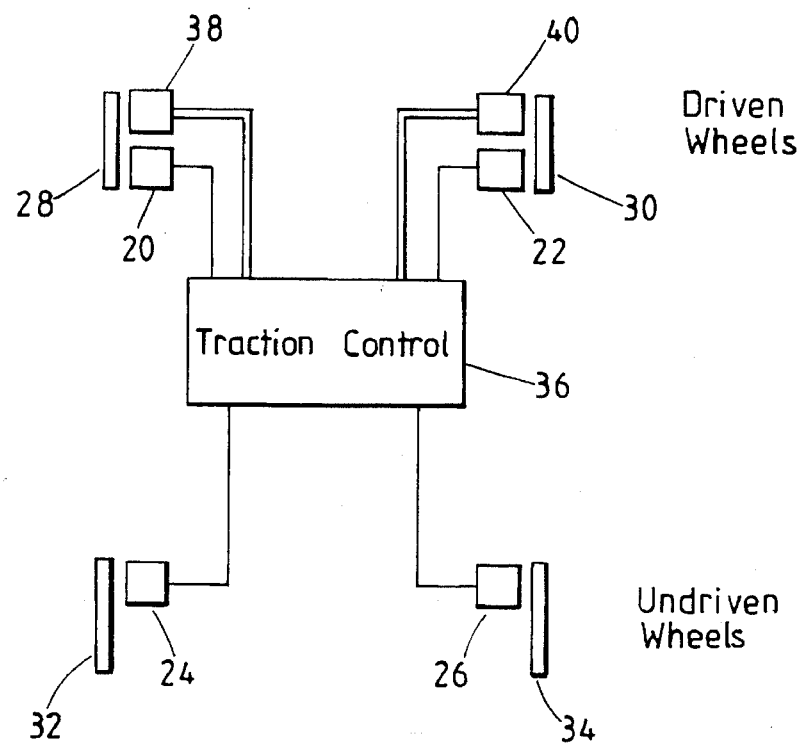
FIG. 2 is a schematic diagram of a traction control apparatus.

The traction control apparatus of FIG. 2 comprises first, second, third and fourth wheel speed sensors 20, 22, 24 and 26 for measuring the speeds of first and second driven wheels 28 and 30 and first and second undriven wheels 32 and 34, respectively. Outputs of the first to fourth wheel speed sensors are connected to respective speed inputs of a traction controller 36. The traction controller is arranged to compare the speeds of the wheels so as to determine when one or more of the driven wheels are spinning. The traction controller 36 is then arranged, when excess spin is detected, to control the brake pressure applied to first and second brakes 38 and 40 of the first and second driven wheels 28 and 30, respectively, in accordance with a strategy described hereinafter. The arrangement of the hydraulic brake system has been omitted for clarity, but each brake is independently controllable such that the braking supplied by one of the brakes during traction control intervention is independent of the braking applied by the other brake (or other brakes in the case of a vehicle having more than two driven wheels).

Figure 3:
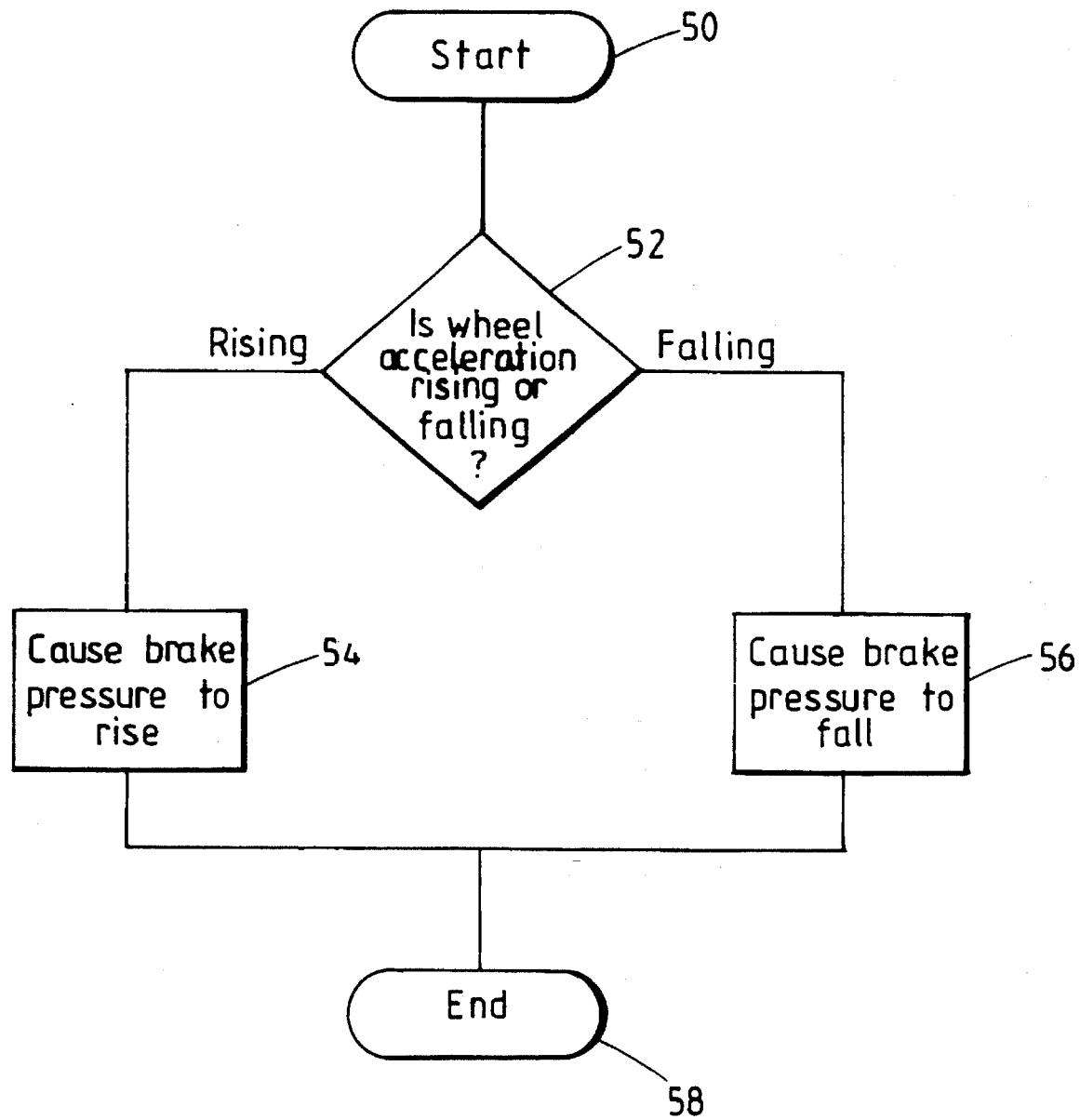
FIG. 3 is a flow chart of a first embodiment of the present invention.

FIG. 3 shows a flow chart suitable for implementing a simplified form of a vibration/resonance control. The flow chart shows the steps of a routine for controlling vibration of only one wheel, however each step may be modified or repeated so as to examine the performance, and control, of each driven wheel. Execution is commenced at step 50. The rate of change of acceleration of the wheel, i.e. $d^2V/dt^2$ where V is the speed of the wheel, is examined at step 52. If the rate of change of acceleration is increasing, i.e. $d^2V/dt^2 > 0$, control is passed to step 54 which causes the fluid pressure provided to the brake to be increased, so as to increase the braking action. If it is determined at step 52 that the rate of change of acceleration is decreasing or steady, i.e. $d^2V/dt^2 \leq 0$, control is passed to step 56 which causes the fluid pressure applied to the brake to be decreased, thereby reducing the braking action. Control is passed to step 58 from steps 54 and 56, at which point the routine is exited. The routine is repeated frequently so as to maintain resonance control.

Figure 4:
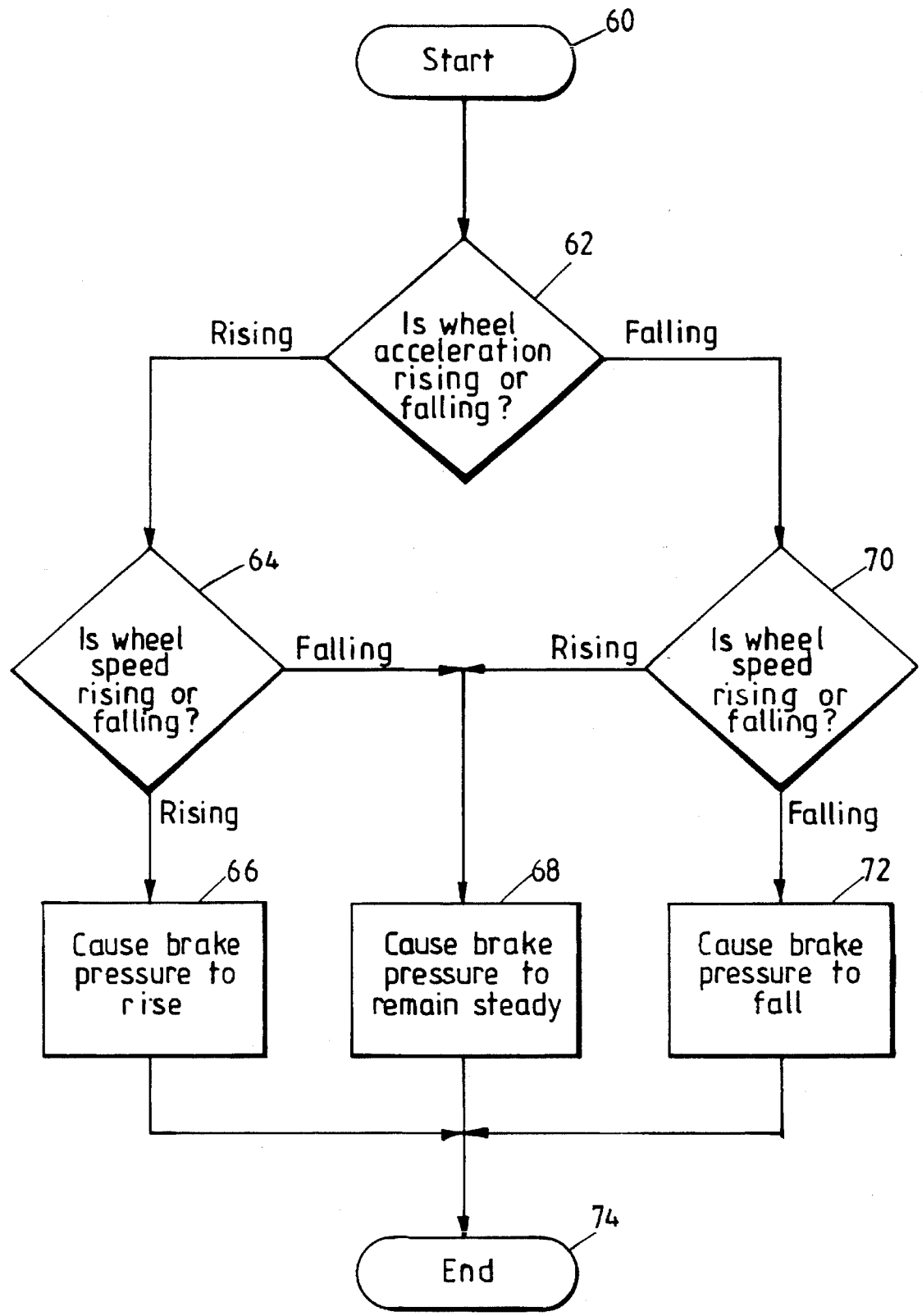
FIG. 4 is a flow chart of a second embodiment of the present invention.

FIG. 4 shows a flow chart for a second embodiment of the invention incorporating wheel speed control. Execution commences at step 60. The rate of acceleration of the wheel, i.e. $d^2V/dt^2$ where V is the speed of the wheel, is examined at step 62. If the rate of acceleration is increasing, i.e. $d^2V/dt^2 > 0$, control is passed to step 64, otherwise control is passed to step 70. The acceleration of the wheel, i.e. dV/dt, is examined as step 64. If the wheel is accelerating, i.e. the wheel speed is increasing, then control is passed to step 66 which causes the brake fluid pressure supplied to the brake to be increased, so as to increase the braking action. If the wheel is not accelerating, control is passed to step 68 which causes the brake fluid pressure to be held steady. Control is passed to step 74 from steps 66 and 68, thereby ending the routine. If control was passed from step 62 to step 70, a similar sequence of actions is executed. The acceleration of the wheel, i.e. dV/dt, is examined at step 70. If the wheel is decelerating, i.e. the wheel speed is decreasing, then control is passed to step 72 which causes the brake fluid pressure supplied to the brake to be decreased, so as to decrease the braking action. Control is passed from step 72 to step 74 thereby exiting the routine. If the wheel is not decelerating, control is passed from step 70 to step 68 which causes the brake fluid pressure to be held steady. The routine has only been described in terms of a single wheel, but the steps described may be modified to cope with two or more driven wheels or the routine may be repeated for each one of the driven wheels. The routine is repeated frequently so as to maintain resonance control.

The action of the flow chart of FIG. 4 is illustrated in FIG. 5. FIGS. 5a and 5b are arranged to illustrate only the oscillatory behavior. FIG. 5a shows wheel acceleration and speed during a period of wheel/suspension resonance during acceleration for a vehicle without means for attenuating the resonance. It can be seen that the traces for acceleration and speed variations are substantially sinusoidal and that speed lags acceleration by approximately 90°.

FIG. 5b shows wheel speed and acceleration for a vehicle having a resonance control apparatus performing the steps illustrated in FIG. 4. FIG. 5c shows the brake fluid pressure applied to a brake for the wheel. Operation of the controller will be described for a period of time starting at time A and finishing at time E.

At time A the rate of change of acceleration becomes positive (acceleration rising) but wheel speed is decreasing, thus control is passed from step 62 to step 64 and then to step 68, thereby causing the brake fluid pressure to remain constant. This situation persists until time B when the wheel starts to accelerate. Now control is passed from step 62 to step 64 and then step 66, thereby causing the brake pressure to be increased. Both the rate of change of acceleration and the acceleration remain positive in the period from time B to time C. During this period the brake pressure is increased substantially monotonically, as illustrated in the period B to C of FIG. 5c.

At time C the wheel speed is still increasing but the rate of acceleration has reached a turning point and starts to decrease ($d^2V/dt^2 < 0$). Control is passed from step 62 to step 70 and then step 68, thereby causing the brake fluid pressure to be held constant. This condition persists until time D when the wheel speed reaches a turning point and the wheel starts to decelerate. Now control is passed from step 62 to step 70 and then to step 72, thereby causing the brake fluid pressure to be decreased. The pressure is decreased substantially monotonically, as shown in the period D to E of FIG. 5c. At time E the rate of acceleration reaches a turning point and starts to increase again. This corresponds to the same conditions as described at time A. Thus the cycle of events described hereinabove is repeated. It can be seen that such a control strategy rapidly attenuates the oscillatory behaviour of the wheel-suspension.

Figure 6:
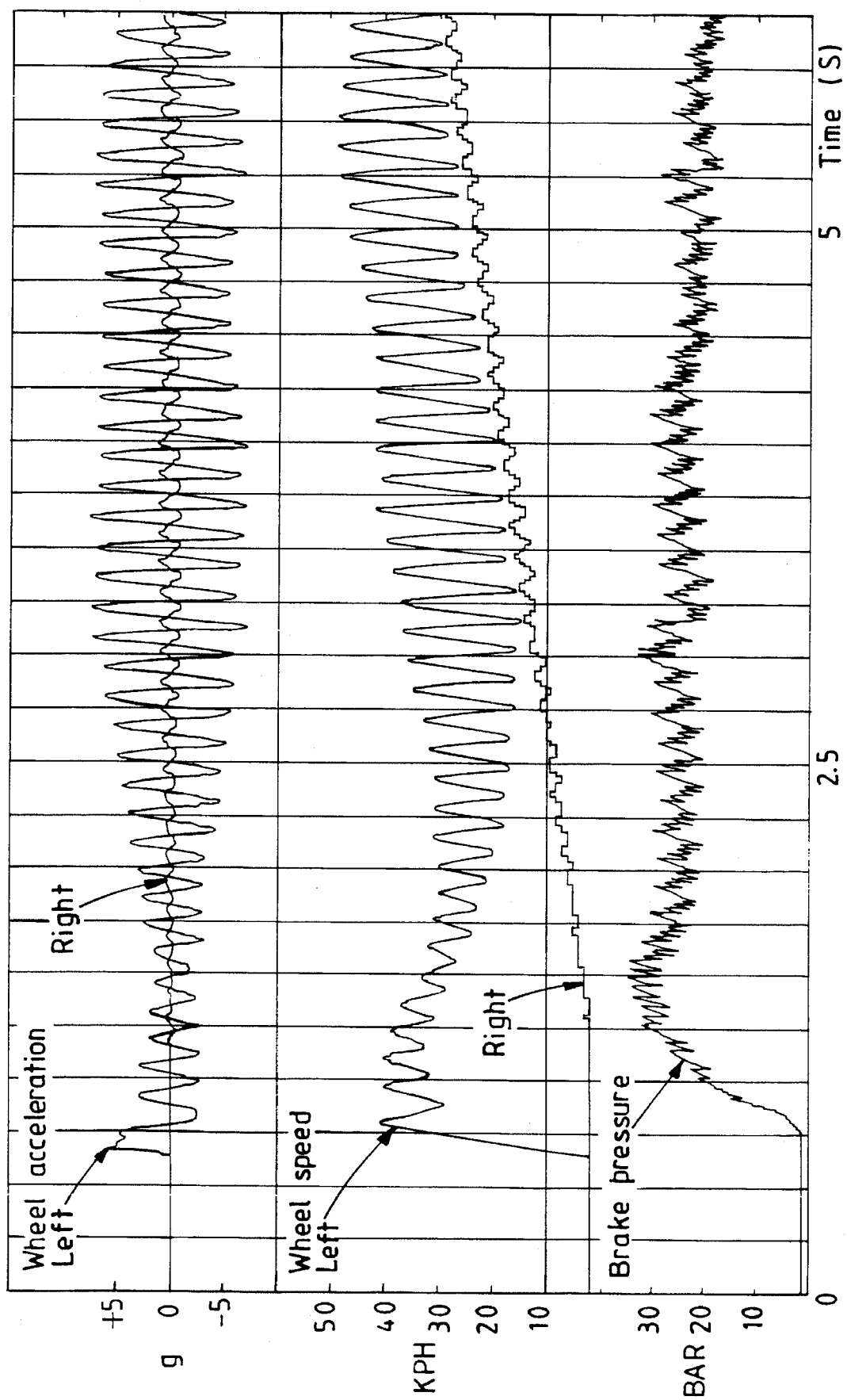
FIG. 6 shows measurements of wheel acceleration, speed and brake pressure during a test using a brake intervention traction controller without resonance control.
Figure 7:
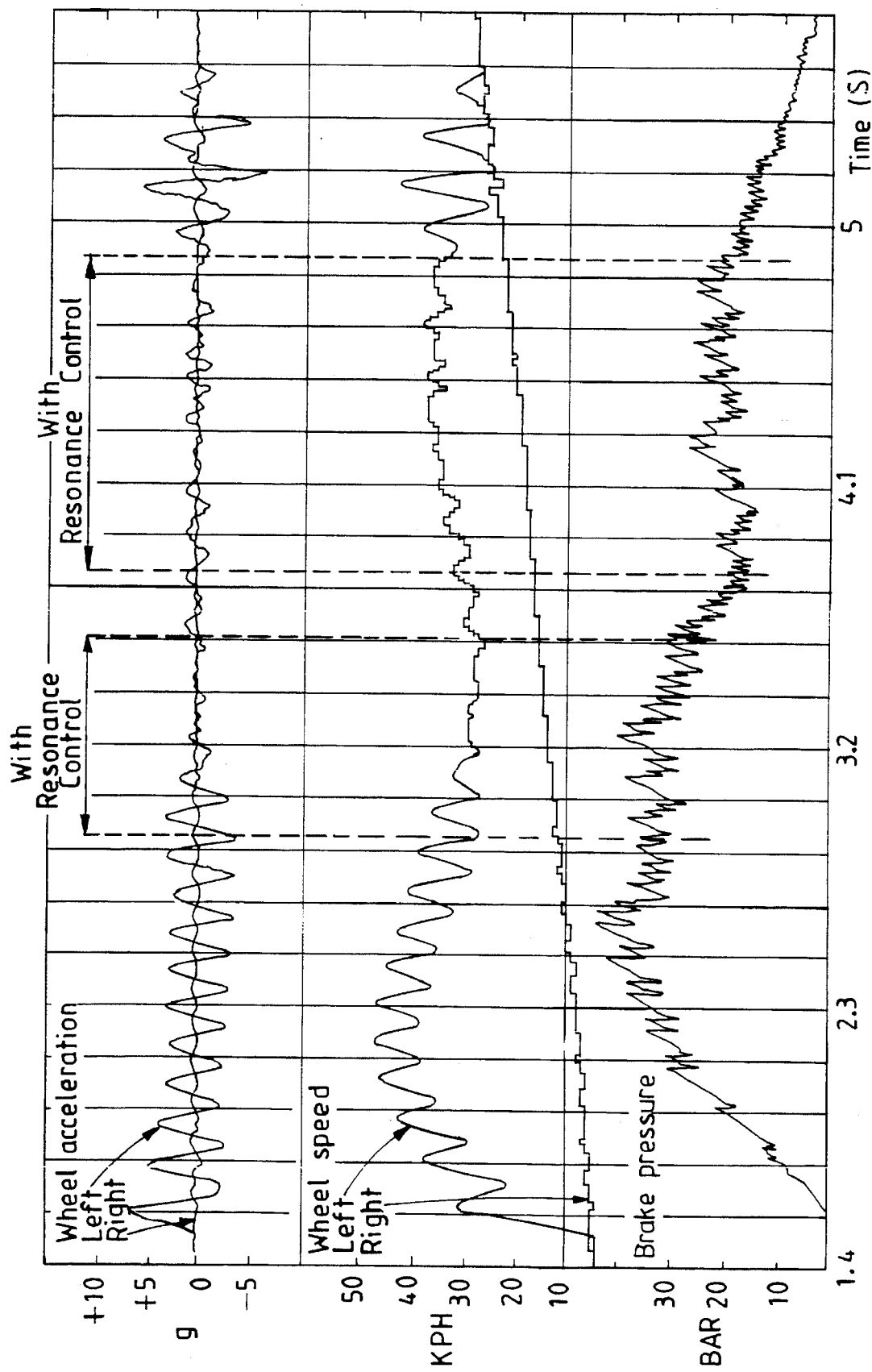
FIG. 7 shows measurements of wheel acceleration, speed and brake pressure during a test using a brake intervention traction controller with the resonance control constituting the first embodiment of the present invention.

FIGS. 6 and 7 show test data taken using a test vehicle on a flat track having a split surface so as to provide different coefficients of friction. The left wheels were on a surface of polished ice and the right wheels were on dry asphalt. The data presented in FIG. 6 shows wheel acceleration, speed and brake pressure with a traction control system enabled and the anti-resonance control disabled. It can be seen that the left wheel undergoes large variations in speed and acceleration as the traction control attempts to control wheel spin to an acceptable threshold.

FIG. 7 shows data where the traction control is enabled and the resonance control is initially disabled, and then is enabled for a while and subsequently disabled, so as to illustrate the effect of the resonance control. Initially the left wheel undergoes substantial amounts of resonance. When the resonance control is enabled, the resonance is brought to within acceptable limits within three cycles of the resonance. The resonance control is then briefly disabled and the left wheel starts to experience resonance again. The resonance control is then re-enabled for a second period in which resonance is maintained within acceptable limits. Finally the resonance control is disabled again and the resonance grows rapidly for a few cycles before decaying away as the speeds of the left and right wheels converge. The brake pressure can be seen to be modulated substantially in phase with the wheel acceleration, this is most clearly seen for the data at the first enablement of the resonance control between approximately 2.9 and 3.3 seconds.

It is thus possible to provide effective control of resonance of the wheels and suspension of a vehicle having a brake intervention traction control.

I claim:

1. An apparatus for resonance control for a brake intervention traction controller arranged to perform traction control by braking of at least one driven wheel, said apparatus comprising:

a detector detecting a rate of change of acceleration of said at least one driven wheel and a controller in communication with said detector, said controller increasing said braking of said at least one driven wheel in response to said detector when an increase in said rate of change of acceleration is detected by said detector.

2. An apparatus as claimed in claim wherein said controller decreases said braking of said at least one driven wheel in response to said detector when a decrease in said rate of change of acceleration is detected by said detector.

3. An apparatus for resonance control for a brake intervention traction controller arranged to perform traction control by braking of at least one driven wheel, said apparatus comprising:

a detector detecting a rate of change of acceleration of said at least one driven wheel and a controller in communication with said detector, said controller decreasing said braking of said at least one driven wheel in response to said detector when a decreased in said rate of change of acceleration is detected by said detector.

4. An apparatus for resonance control for a brake intervention traction controller arranged to perform traction control by braking of at least one driven wheel, said apparatus comprising:

a first detector detecting a rate of change of acceleration of said at least one driven wheel, a second detector detecting a wheel speed of said at least one driven wheel and a controller in communication with said first and second detectors, said controller increasing said braking of said at least one driven wheel in response to said first and said second detectors when an increase in said rate of change of acceleration and an increase in said wheel speed are detected by said first and second detectors, respectively.

5. An apparatus as claimed in claim 4, wherein said controller decreases said braking of said at least one driven wheel in response to said first and second detectors when a decrease in said rate of change of acceleration and a decrease in said wheel speed is detected by said first and second detectors, respectively.

6. An apparatus as claimed in claim 4, wherein said controller maintains said braking of said at least one driven wheel in response to said first and said second detectors when said increase in said rate of change of acceleration and a decrease in said wheel speed are detected by said first and second detectors, respectively.

7. An apparatus for resonance control for a brake intervention traction controller arranged to perform traction control by braking of at least one driven wheel, said apparatus comprising:

a first detector detecting a rate of change of acceleration of said at least one driven wheel, a second detector detecting a wheel speed of said at least one driven wheel and a controller in communication with said first and second detectors, said controller decreasing said braking of said at least one driven wheel in response to said first and said second detectors when a decrease in said rate of change of acceleration and a decrease in said wheel speed are detected by said first and said second detectors, respectively.

8. An apparatus as claimed in claim 7, wherein said controller maintains said braking of said at least one driven wheel in response to said first and said second detectors when said decrease in said rate of change of acceleration and an increase in said wheel speed are detected by said first and said second detectors, respectively.

* * * * *